United States Patent
Tanaka et al.

(10) Patent No.: US 9,411,162 B2
(45) Date of Patent: Aug. 9, 2016

(54) MIXED REALITY PRESENTING SYSTEM, VIRTUAL REALITY PRESENTING SYSTEM, DISPLAY APPARATUS, INFORMATION PROCESSING APPARATUS, CONTROL METHOD, AND PROGRAM

(71) Applicant: CANON KABUSHIKI KAISHA, Tokyo (JP)

(72) Inventors: Yasumi Tanaka, Funabashi (JP); Kenji Hatori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 14/222,344

(22) Filed: Mar. 21, 2014

(65) Prior Publication Data
US 2014/0285518 A1    Sep. 25, 2014

(30) Foreign Application Priority Data
Mar. 22, 2013 (JP) ................. 2013-060272

(51) Int. Cl.
*G09G 5/00* (2006.01)
*G02B 27/01* (2006.01)
*G09G 3/00* (2006.01)

(52) U.S. Cl.
CPC ............. *G02B 27/017* (2013.01); *G09G 3/003* (2013.01); *G02B 2027/014* (2013.01); *G02B 2027/0138* (2013.01); *G09G 2320/046* (2013.01); *G09G 2320/048* (2013.01); *G09G 2340/12* (2013.01); *G09G 2354/00* (2013.01)

(58) Field of Classification Search
None
See application file for complete search history.

(56) References Cited

U.S. PATENT DOCUMENTS

| 9,106,984 B2 * | 8/2015 | Mukai ............. H04L 12/40013 |
| 2001/0005285 A1 * | 6/2001 | Tanaka ................. G02B 27/017 359/630 |
| 2006/0050087 A1 * | 3/2006 | Tanimura ............... G06F 3/011 345/629 |
| 2008/0266323 A1 * | 10/2008 | Biocca ..................... G06F 3/014 345/633 |
| 2009/0069056 A1 * | 3/2009 | Lee ....................... G06F 1/3203 455/566 |
| 2013/0241955 A1 * | 9/2013 | Tamaru .................. G03B 27/01 345/633 |

FOREIGN PATENT DOCUMENTS

| JP | 2004096224 A | 3/2004 |
| JP | 2008-257671 A | 10/2008 |
| JP | 2009109731 A | 5/2009 |
| JP | 2011-175439 A | 9/2011 |

* cited by examiner

*Primary Examiner* — David H Chu
(74) *Attorney, Agent, or Firm* — Canon USA, Inc., IP Division

(57) ABSTRACT

To provide a function of easily preventing burn-in at low cost without disturbing mixed reality being experienced by a user, a mixed reality presenting system includes a display control unit configured to display a confirmation image on a display unit when a first time period has elapsed since the display control unit had performed control to start display on the display unit, and to control display on the display unit in response to an operation performed on the confirmation image by a user of the mixed reality presenting system.

12 Claims, 6 Drawing Sheets

MIXED REALITY PRESENTING SYSTEM, VIRTUAL REALITY PRESENTING SYSTEM, DISPLAY APPARATUS, INFORMATION PROCESSING APPARATUS, CONTROL METHOD, AND PROGRAM

BACKGROUND OF THE INVENTION

1. Field of the Invention

The present invention relates to a system for preventing burn-in of the screen of a display apparatus in a system for presenting mixed reality or virtual reality.

2. Description of the Related Art

In recent years, active researches have been performed on mixed reality (MR) aiming at seamless coupling of the real and the virtual spaces. An image display apparatus for presenting mixed reality has, for example, the following configuration. Specifically, the image display apparatus superimposes, onto real space images captured by an imaging apparatus such as a video camera, virtual reality space images (for example, virtual objects, text information drawn by using computer graphics) generated according to the position and orientation of the imaging apparatus. For example, a head-mounted display (HMD) can be used for such an image display apparatus.

The image display apparatus is implemented also by the optical see-through method for displaying, on an optical see-through type display mounted on a user's head, a virtual space image generated according to the position and orientation of the user's viewpoint.

Meanwhile, Japanese Patent Application No. 2007-281654 also discusses a method for preventing burn-in when displaying an image on a display. Specifically, in the method, an audio-video (AV) apparatus outputs video data to a display apparatus configured to display a video image on a display screen, and a control apparatus capable of performing data communication mutually with the AV apparatus detects that the video data output from the AV apparatus is in a still image state. In a case where the control apparatus detects that the video data is in the still image state, the control apparatus stops reproducing the video data, and changes the state of a power source unit of the AV apparatus from an ON state to an OFF state by executing a power source changeover program, thereby preventing burn-in.

Japanese Patent Application No. 2002-251667 discusses a method for detecting by using a sensor whether a user wears an HMD, and if the user does not wear the HMD, turning OFF the power of the HMD to effectively prevent unnecessary power consumption when the HMD is not in use.

However, with the method discussed in Japanese Patent Application No. 2007-281654, since the control apparatus detects that the video data is in the still image state and controls the power source, there may be a case where the control apparatus stops the video data or turns OFF the power of the display while the user is experiencing mixed reality via the HMD. This case causes a problem that the mixed reality video image is suddenly interrupted to make the user unable to continue experiencing it, which disturbs the user's immersive feeling.

The method discussed in Japanese Patent Application No. 2002-251667 has a problem that it cannot be easily performed because it involves the cost for adding a hardware configuration.

SUMMARY OF THE INVENTION

According to an aspect of the present invention, a mixed reality presenting system includes a display apparatus and an information processing apparatus configured to generate a combined image to be displayed on the display apparatus. The display apparatus includes an imaging unit configured to capture a real space image, a first output unit configured to output the captured real space image to the information processing apparatus, and a display unit configured to acquire a combined image of the captured real space image and virtual space data from the information processing apparatus, and to display the acquired combined image. The information processing apparatus includes a first display control unit configured to control display on the display unit, and a second output unit configured to acquire the real space image captured by the imaging unit from the display apparatus, to combine the real space image with the virtual space data, and to output the combined image to the display apparatus. When a first time period has elapsed since the first display control unit had performed control to start display on the display unit, the first display control unit displays a confirmation image on the display unit, and controls display on the display unit in response to an operation performed on the confirmation image by a user of the mixed reality presenting system.

According to the present invention, it becomes possible to easily prevent burn-in at low cost without disturbing mixed reality being experienced by the user.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
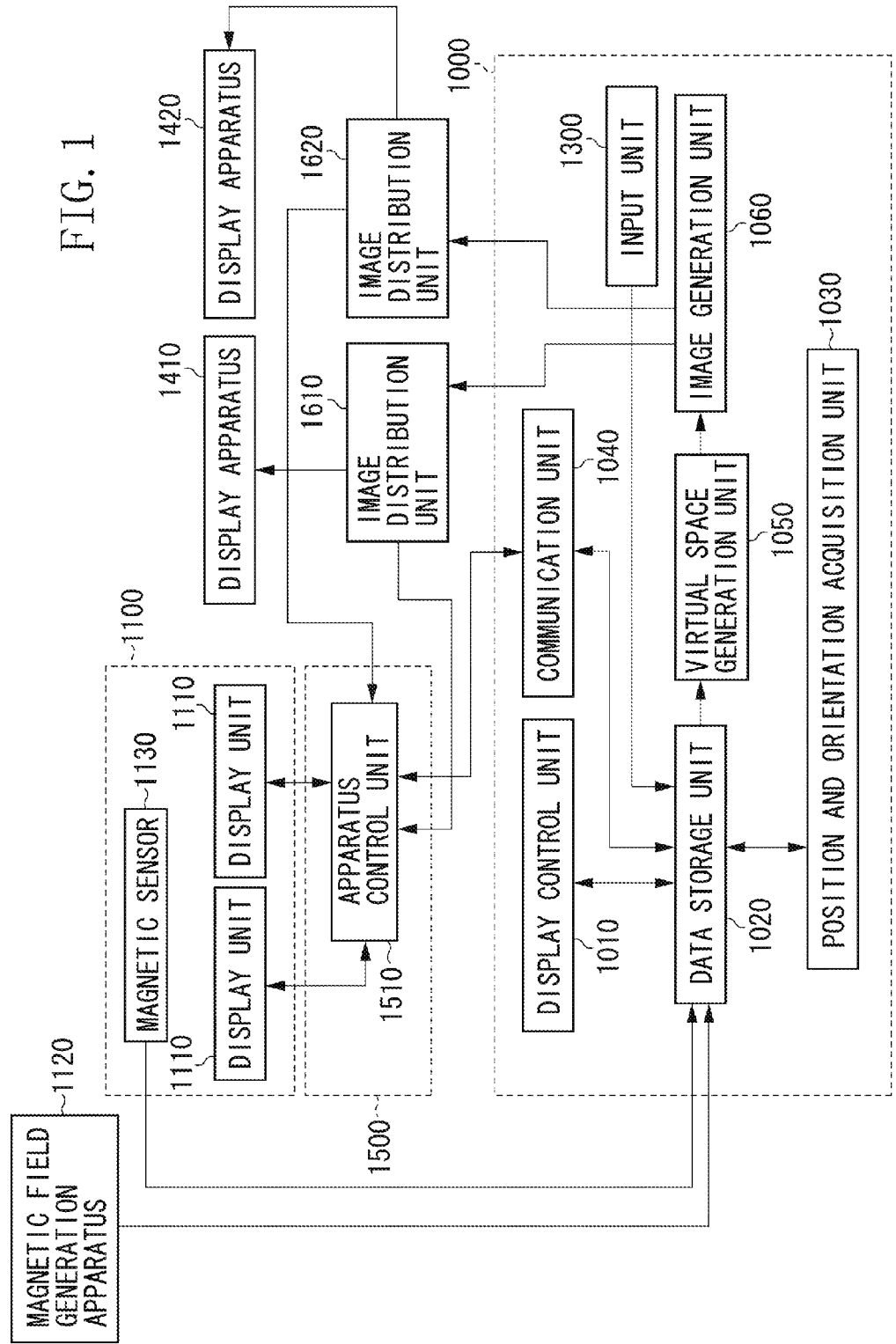
FIG. 1 is a block diagram illustrating an example of a functional configuration of a system according to a first exemplary embodiment.

FIG. 1 is a block diagram illustrating an example of a functional configuration of a virtual reality presenting system according to a first exemplary embodiment. As illustrated in FIG. 1, the virtual reality presenting system according to the present exemplary embodiment includes an information processing apparatus 1000, a display apparatus 1100, external display apparatuses 1410 and 1420, a control apparatus 1500, image distribution units 1610 and 1620, and an input unit 1300. The information processing apparatus 1000 includes a display control unit 1010, a data storage unit 1020, a position and orientation acquisition unit (i.e., position and orientation measurement unit) 1030, a communication unit 1040, a virtual space generation unit 1050, and an image generation unit 1060. The information processing apparatus 1000 and the control apparatus 1500 are connected so that data communication therebetween can be performed. Therefore, the information processing apparatus 1000 and the control apparatus 1500 may be wiredly or wirelessly connected with each other. The display apparatus 1100 and the control apparatus 1500 are connected such that data communication therebetween can be performed. Therefore, the display apparatus 1100 and an apparatus control unit 1510 may be wiredly or wirelessly connected with each other. Although, in the present exemplary embodiment, the external display apparatuses 1410 and 1420 are described as external display apparatuses, either one apparatus may be included as an external display apparatus.

The information processing apparatus 1000 according to the present exemplary embodiment will be described below.

The information processing apparatus 1000 includes the display control unit 1010, the position and orientation acquisition unit 1030, the data storage unit 1020, the virtual space generation unit 1050, the communication unit 1040, the image generation unit 1060, and the input unit 1300.

The display control unit 1010 transmits a control signal to display units 1110 of the display apparatus 1100 via the communication unit 1040 to perform processing for controlling display on the display units 1110. Although the processing on the display units 1110 of the display apparatus 1100 by the display control unit 1010 includes processing for turning display on the display units 1110 ON and OFF, and screen saver processing, the processing is not limited thereto. Although, in the present exemplary embodiment, the display control unit 1010 turns display on the display units 1110 ON and OFF, the display control unit 1010 may control ON/OFF of the power source of the display apparatus 1100 itself. This processing will be described in detail below with reference to the flowchart illustrated in FIG. 3.

The position and orientation acquisition unit 1030 measures the position and orientation of a user's viewpoint in the virtual space by using the result of measurement by a magnetic sensor 1130, and outputs the measurement result to the data storage unit 1020.

As described above, the data storage unit 1020 is used to store various types of information, and includes a random access memory (RAM) and a hard disk drive device. In addition to the above-described information to be stored in the data storage unit 1020, the data storage unit 1020 also stores information described as known information in the present exemplary embodiment.

The virtual space generation unit 1050 generates virtual space data based on data of the virtual space stored in the data storage unit 1020. The virtual space data includes data related to each virtual object constituting the virtual space, and data related to a light source for irradiating the virtual space.

The communication unit 1040 transmits a display panel ON signal and a display panel OFF signal stored in the data storage unit 1020 to the apparatus control unit 1510.

The image generation unit 1060 generates a virtual space image viewed from a viewpoint in the virtual space generated by the virtual space generation unit 1050. Then, the image generation unit 1060 outputs the generated virtual space image to the display units 1110 of the display apparatus 1100 via the image distribution units 1610 and 1620. The image generation unit 1060 may simultaneously display the virtual space image on the external display units 1410 and 1420. The technique for generating a virtual space image viewed from a viewpoint having a predetermined position and orientation is a known technique, and detailed description thereof will be omitted.

The input unit 1300 is a unit capable of inputting user operations, and is used to start, shut down, and operate the information processing apparatus 1000. For example, the input unit 1300 is also used to input an operation performed on a confirmation image (described below) to restart processing. As long as the above-described purpose can be achieved, the input unit 1300 may be an input apparatus of any type, for example, a mouse, a button type apparatus such as a keyboard, and an input apparatus configured to perform input by recognizing user gesture.

The control apparatus 1500 according to the present exemplary embodiment will be described below.

As described above, the control apparatus 1500 is connected with the display apparatus 1100 and the information processing apparatus 1000 to perform data communication therewith. The control apparatus 1500 includes a communication unit (not illustrated) and the apparatus control unit 1510.

The apparatus control unit 1510 receives the display panel ON/OFF signal for the display units 1110 from the communication unit 1040 via a communication unit (not illustrated), and transmits the display panel ON/OFF signal to the display apparatus 1100 via a communication unit (not illustrated) to control display on the display units 1110 (display ON/OFF or screen saver). The apparatus control unit 1510 includes a power source of the display apparatus 1100. When the user turns ON the power source of the display apparatus 1100 included in the apparatus control unit 1510, the power of the display apparatus 1100 is turned ON, and accordingly the power of the display units 1110 is also turned ON. When the user turns OFF the power source of the display apparatus 1100, the power of the display apparatus 1100 is turned OFF, and accordingly the power of the display units 1110 is also turned OFF. The apparatus control unit 1510 also receives virtual space images from the image distribution units 1610 and 1620 via a communication unit (not illustrated), and transmits the virtual space images to the display units 1110 via a communication unit (not illustrated). Even if the apparatus control unit 1510 receives no control signal from the display control unit 1010 via the communication unit 1040 as described below, in a case where a predetermined condition is satisfied, the apparatus control unit 1510 controls display on the display units 1110. Although, in the present exemplary embodiment, the control apparatus 1500 is provided outside the display apparatus 1100, the display apparatus 1100 may be provided with the function of the control apparatus 1500. In other words, the display apparatus 1100 and the control apparatus 1500 may be integrally formed.

The display apparatus 1100 according to the present exemplary embodiment will be described below.

The display apparatus 1100 includes the display units 1110, the magnetic sensor 1130, and a communication unit (not illustrated). The display apparatus 1100 may be a display apparatus including a liquid crystal display (LCD) or organic electro-luminescence (EL) display, and can be an HMD apparatus which enables the user to observe an image, a handheld display (HHD) apparatus which enables the user to observe an image while holding it with a hand and looking it into like binoculars, or a display terminal such as a tablet or a smart phone, for example. The present exemplary embodiment is described to use a stereo type HMD as the display apparatus 1100. The display apparatus 1100 displays an image transmitted from the information processing apparatus 1000. The display units 1110 of the display apparatus 1100 are provided for the right and left eyes, respectively. The display units 1110 are disposed so as to be respectively positioned in front of right and left eyes of the user who wears the display apparatus 1100 on the head.

Each of the display units 1110 includes an LCD. The images output from the information processing apparatus 1000 and distributed by the image distribution units 1610 and 1620 via a communication unit (not illustrated) and the apparatus control unit 1510 are respectively displayed on each of the display units 1110 for the user's right and left eyes.

The magnetic sensor 1130 measures changes of a magnetic field generated by a magnetic field generation apparatus 1120, measures the position and orientation of the display apparatus 1100, and transmits the result of the measurement to the data storage unit 1020 of the information processing apparatus 1000.

The magnetic field generation apparatus 1120 generates a magnetic field for measuring the position and orientation of the display apparatus 1100, and transmits data of the generated magnetic field to the data storage unit 1020 of the information processing apparatus 1000. Changes of the generated magnetic field are measured by the magnetic sensor 1130.

The external display apparatuses 1410 and 1420 display, via the image distribution units 1610 and 1620, respectively, images generated by the image generation unit 1060. The external display apparatuses 1410 and 1420 display the same images as the screens displayed on the display units 1110 of the display apparatus 1100, respectively. The external display apparatuses 1410 and 1420 function as a display apparatus for displaying the contents of processing performed by the information processing apparatus 100. The external display apparatuses 1410 and 1420 are provided to allow a third person (a person other than the user wearing the display apparatus 1100) to observe the image viewed by the user. The external display apparatuses 1410 and 1420 also allow the user to confirm the image before wearing the display apparatus 1100. As described below, even in a state where display on the display units 1110 is OFF, the external display apparatuses 1410 and 1420 can also be used by the user to respond to the confirmation image displayed for the user.

Figure 3:
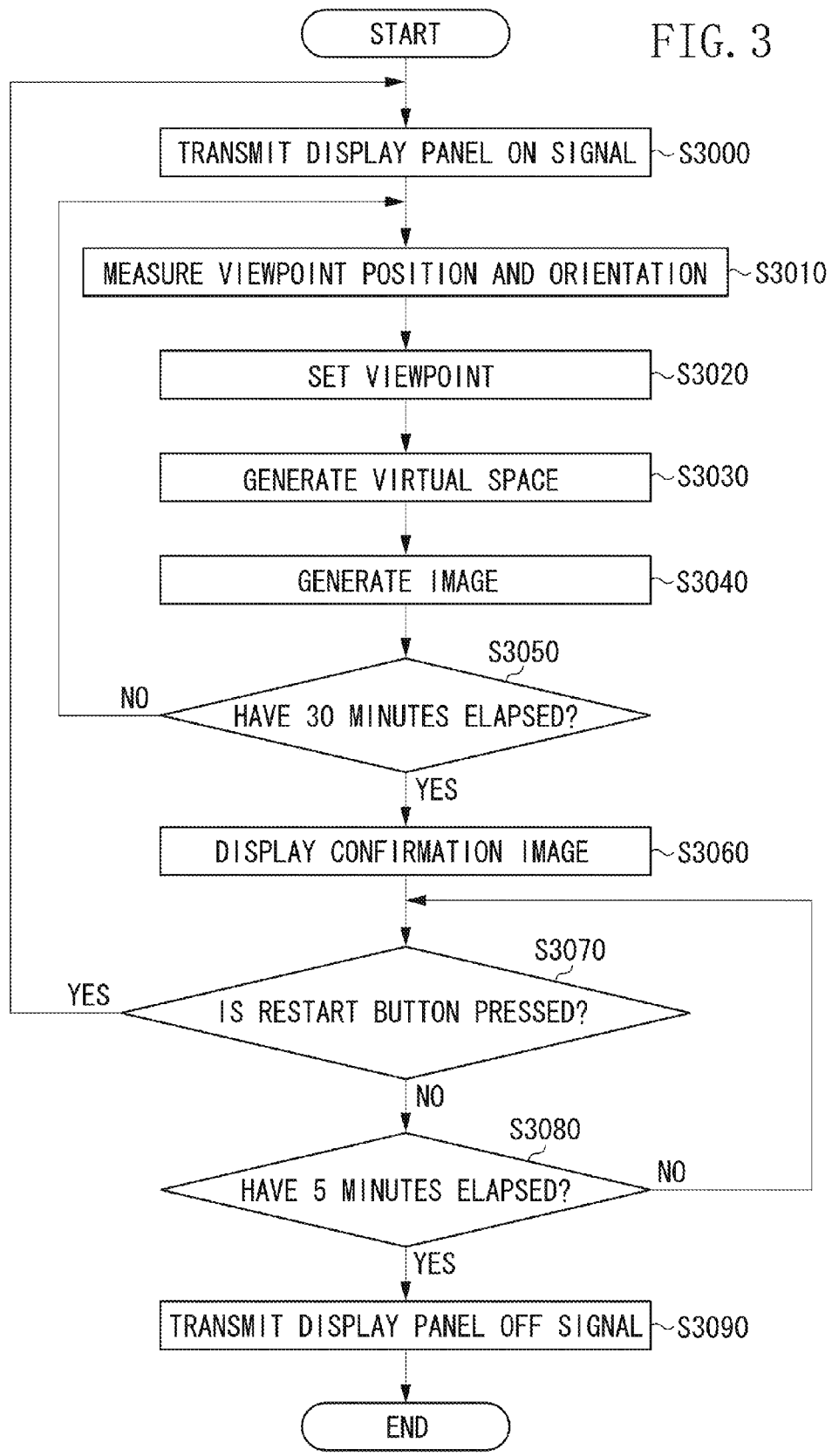
FIG. 3 is a flowchart illustrating processing performed by an information processing apparatus according to the first exemplary embodiment.

FIG. 3 is a flowchart illustrating processing performed by the information processing apparatus 1000 to transmit the display panel ON/OFF signal to the apparatus control unit 1510, generate a virtual space image, and output the generated virtual space image to the image distribution units 1610 and 1620.

In step S3000, the display control unit 1010 transmits the display panel ON signal to the apparatus control unit 1510 via the data storage unit 1020 and the communication unit 1040. Then, the processing proceeds to step S3010. Further, to determine whether the user is using the display apparatus before transmitting the display panel ON signal, the display control unit 1010 may transmit the display panel ON signal only when a camera has the stereo configuration.

In step S3010, the position and orientation acquisition unit 1030 measures the position and orientation of the display apparatus 1100 in a world coordinate system, and stores the measurement result of the position and orientation of the viewpoint in the data storage unit 1020. Then, the processing proceeds to step S3020.

In step S3020, the virtual space generation unit 1050 sets the measurement result of the position and orientation of the viewpoint stored in the data storage unit 1020 as a position and orientation of the user's viewpoint in the virtual space. Then, the processing proceeds to step S3030.

In step S3030, the virtual space generation unit 1050 generates a virtual space based on the position and orientation of the user's viewpoint set in step 3020 and a virtual object. Then, the processing proceeds to step S3040.

In step S3040, the image generation unit 1060 reads the virtual space from the data storage unit 1020, generates images which can be viewed from the position and orientation of the user's viewpoint, and outputs the generated images to the image distribution units 1610 and 1620. The image distribution unit 1610 outputs the images to the external display apparatus 1410 and the apparatus control unit 1510. The apparatus control unit 1510 outputs the images to the display units 1110 of the display apparatus 1100. Then, the processing proceeds to step 3050.

In step S3050, after transmitting the display panel ON signal in step S3000, display control unit 1010 determines whether 30 minutes (first time period) have elapsed. When 30 minutes have not elapsed (NO in step S3050), the processing returns to step S3010. On the other hand, when 30 minutes have elapsed, the processing proceeds to step S3060.

In step S3060, the display control unit 1010 displays a confirmation image on the display units 1110. Then, the processing proceeds to step S3070. The confirmation image according to the present exemplary embodiment refers to an image used to determine whether the user continues using the mixed reality presenting system. Specifically, the confirmation image is used to determine whether the user successively uses the system after the user has experienced virtual reality for a predetermined time period since the images had been displayed on the display units 1110. Controlling display on the display units 1110 according to whether the user performs an operation within a second time period (described below) since the confirmation image has been displayed enables preventing burn-in due to fixed display on the display units 1110 of the display apparatus 1100 which has been taken off and left by the user. Further, in the present exemplary embodiment, the confirmation image includes a RESTART button for indicating that the user continues using the mixed reality presenting system. Of course, the confirmation image may include a button for continuing the use and a button for ending the use.

In steps 3070 and 3080, display control unit 1010 determines whether the user presses the RESTART button displayed in the confirmation image via the input unit 1300 before 5 minutes (second time period) elapses since the confirmation image has been displayed. When the user presses the RESTART button before 5 minutes elapses (YES in step S3070), the processing returns to step S3000. On the other hand, when the user does not press the RESTART button before 5 minutes elapses (NO in step S3070, YES in step S3080), the processing proceeds to step S3090. In step S3090, the display control unit 1010 transmits the display panel OFF signal to the apparatus control unit 1510 via the data storage unit 1020 and the communication unit 1040.

In a case where the display control unit 1010 does not receive a response from the user within the second time period since the confirmation image has been displayed (NO in step S3070, YES in step S3080), then in step S3090, the display control unit 1010 automatically turns OFF display on the display units 1110, thereby preventing burn-in due to fixed display on the display units 1110 of the display apparatus 1100 which has been taken off and left by the user. In other words, the second time period is a waiting time for a response from the user.

In step S3090, the display control unit 1010 transmits the display panel OFF signal to the apparatus control unit 1510 via the data storage unit 1020 and the communication unit 1040, and the apparatus control unit 1510 transmits the display panel OFF signal to the display units 1110 to turn OFF display on the display units 1110 (first display control). Then, the processing ends. Even after display on the display units 1110 is turned OFF, the display control unit 1010 keeps displaying the confirmation image on the external display apparatuses 1410 and 1420 to receive a user operation made on the confirmation image. Upon reception of a RESTART instruction from the user (equivalent to step S3070), the processing returns to step S3000.

As described above, the display units 1110 of the display apparatus 1100 can be controlled by the information processing apparatus 1000.

Figure 4:
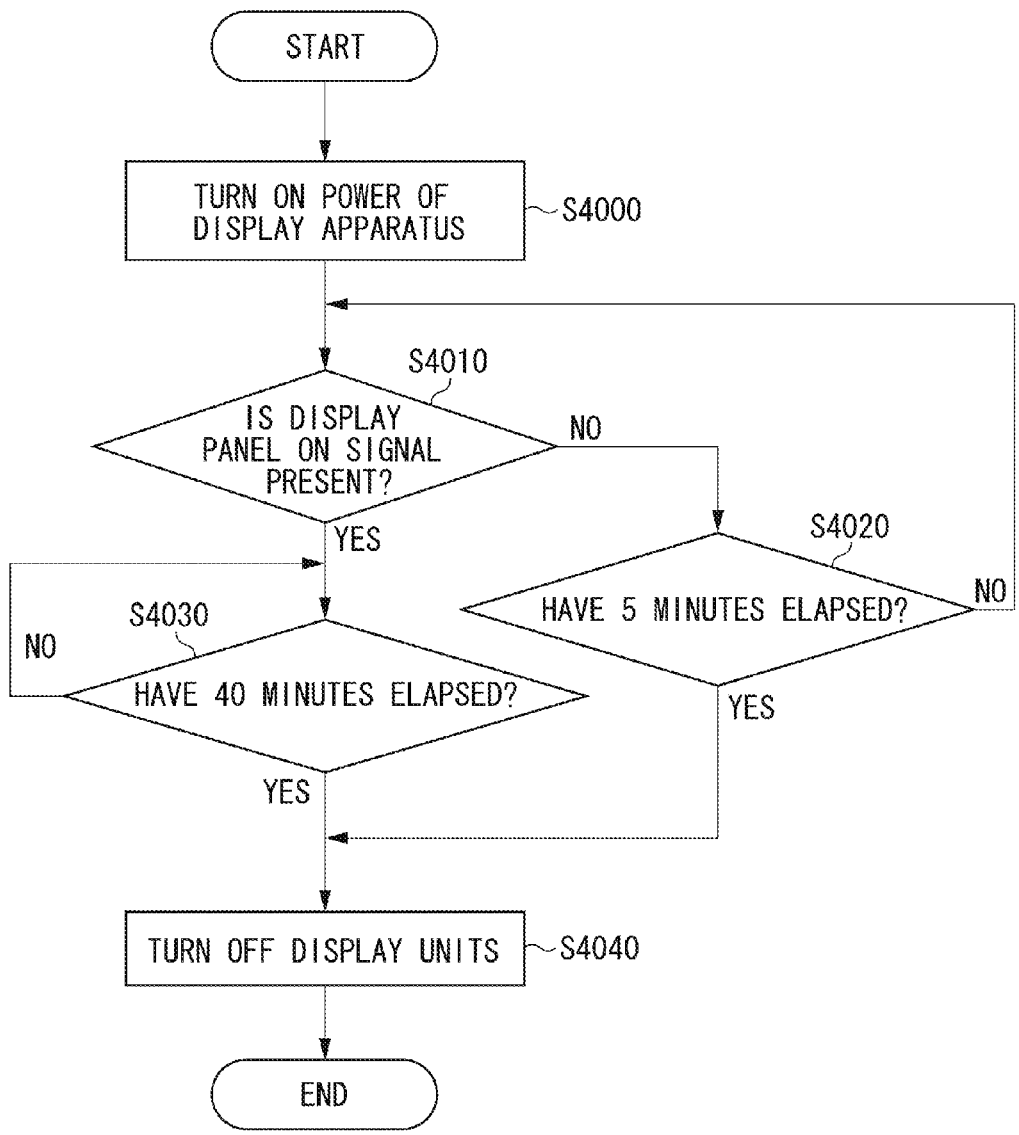
FIG. 4 is a flowchart illustrating processing performed by an apparatus control unit according to the first exemplary embodiment.

FIG. 4 is a flowchart of processing performed by the apparatus control unit 1510 to transmit the display panel ON/OFF signal to the display apparatus 1100.

In step S4000, the apparatus control unit 1510 turns ON the power source of the display apparatus 1100 based on the signal from the apparatus control unit 1510 of the control apparatus 1500 in response to a user operation. When the power source of the display apparatus 1100 is turned ON, display on the display units 1110 is also turned ON. Then, the processing proceeds to step S4010.

In step S4010, the apparatus control unit 1510 determines whether the display panel ON signal transmitted in step S3000 is transmitted from the display control unit 1010 to the display units 1110 via the communication unit 1040. When the display panel ON signal is transmitted to the display units 1110 (YES in step S4010), the processing proceeds to step S4030. On the other hand, when the display panel ON signal is not transmitted to the display units 1110 (NO in step S4010), the processing proceeds to step S4020.

In step S4020, the apparatus control unit 1510 determines whether 5 minutes (fourth time period) have elapsed since the processing in step S4000 had been performed. When 5 minutes have elapsed (YES in step S4020), the processing proceeds to step S4040. On the other hand, when 5 minutes have not elapsed (NO in step S4020), the processing returns to step S4010. In the processing, even if the apparatus control unit 1510 does not receive the display panel ON signal from the display control unit 1010 within 5 minutes, the display control unit 1010 turns ON display on the display units 1110. Even if the user cannot confirm the image in an environment where, for example, the external display apparatuses 1410 and 1420 are not connected, this processing allows the user to operate the information processing apparatus 1000 while wearing the display apparatus 1100 for a certain time period (fourth time period).

In step S4030, the apparatus control unit 1510 determine whether 40 minutes (third time period) have elapsed since it had confirmed the reception of the display panel ON signal from the display control unit 1010 in step S4020. When 40 minutes have elapsed (YES in step S4030), the processing proceeds to step S4040. On the other hand, when 40 minutes have not elapsed (NO in step S4030), the processing in step S4030 is repeated. Even if the apparatus control unit 1510 does not receive the display panel ON signal from the display control unit 1010 because, for example, the power of the information processing apparatus 1000 is turned OFF, this processing enables the apparatus control unit 1510 to automatically turn OFF display on the display units 1110 in step 4040 (second display control). In other words, the second display control functions if the display control unit 1010 cannot normally control display on the display units 1110 as described with reference to FIG. 3. Therefore, it is desirable that the third time period is longer than the sum of the first and the second time periods.

In step S4040, the apparatus control unit 1510 of the control apparatus 1500 turns OFF display on the display units 1110 of the display apparatus 1100. In a case where the apparatus control unit 1510 receives the display panel ON signal from the display control unit 1010 even after display on the display units 1110 is turned OFF, the processing restarts from step S4010 to turn ON display on the display units 1110.

Referring to FIG. 4, during the processing in steps S4030 and S4040, since the display panel ON signal from the display control unit 1010 is present, the information processing apparatus 1000 parallelly performs the processing from step S3000 illustrated in FIG. 3. For example, even if the measurement of the third time period is started after the processing in step S4030, in a case where the user responds to the confirmation image in step S3070, the measurement of the third time period is reset. Specifically, the timing to start measuring the third time period is changed from step S4030 to step S3070.

In any step of the above-described flowcharts, the user can terminate the virtual reality presenting system via the apparatus control unit 1510 and the input unit 1300.

Although, in the present exemplary embodiment, 30, 5, 40, and 5 minutes are set as the first, second, third, and fourth time periods, respectively, the values are to be considered as examples and not limited thereto. In other words, the time periods may be set to any desired values suitable for the target scene and the user. The time periods may be customized by the user via the input unit 1300. The time periods may be set to variable values, not fixed values, according to such parameters as the number of operations and operation hours.

As described above, according to the present exemplary embodiment, it becomes possible to provide a function of reliably preventing burn-in of the display units 1110 of the display apparatus 1100 at low cost.

Figure 5:
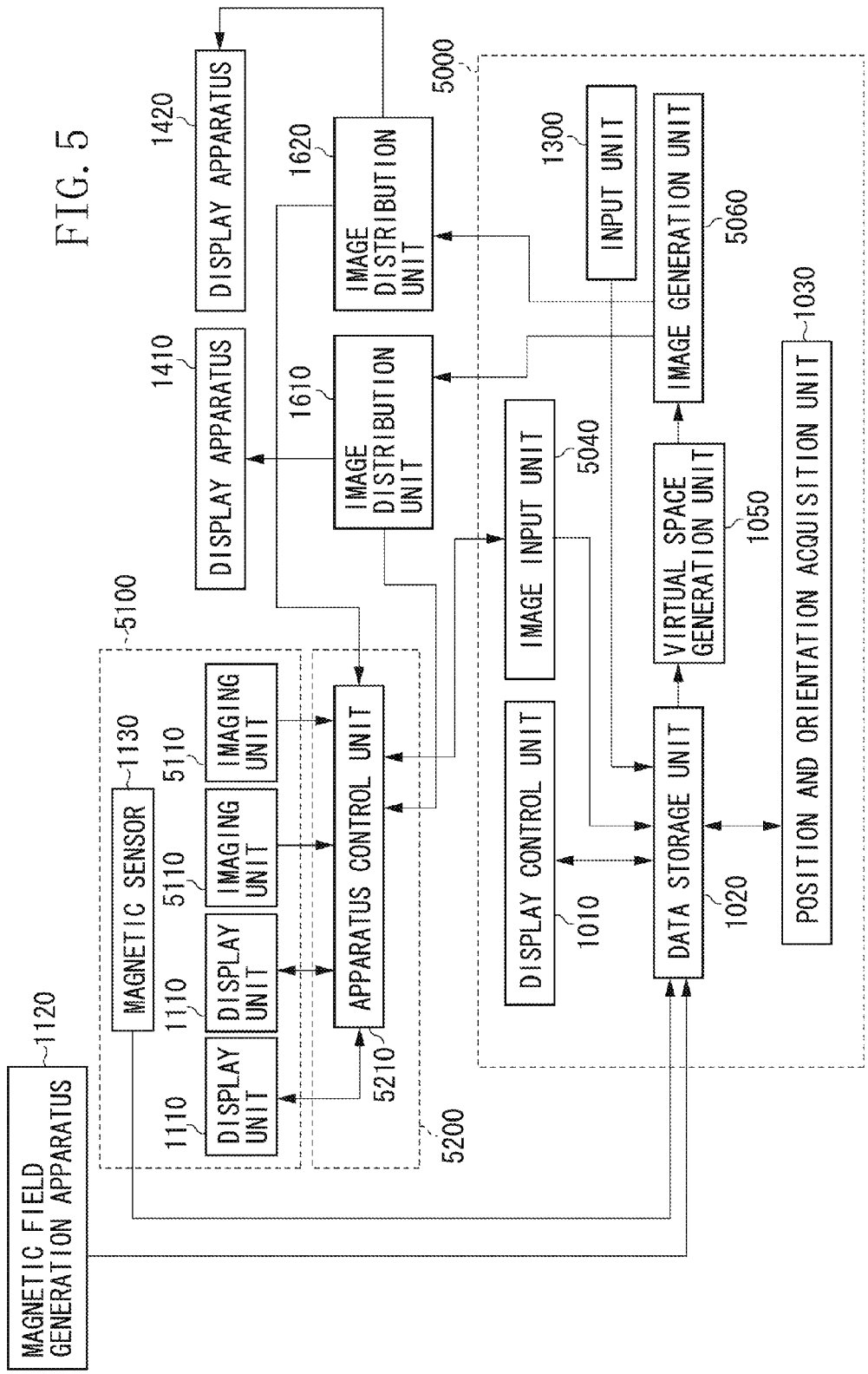
FIG. 5 is a block diagram illustrating an example of a functional configuration of a system according to a second exemplary embodiment.

In the first exemplary embodiment, the display apparatus 1100 is an apparatus for providing the user with a virtual reality space. In a second exemplary embodiment, the present invention is applied by using as the display apparatus 1100 a video see-through type HMD for presenting a mixed reality space combining captured real space images with a virtual space image (mixed reality presenting system). FIG. 5 illustrates a case where a video see-through type HMD 5100 is used. Components equivalent to those in FIG. 1 are assigned with the same reference numerals and redundant descriptions thereof will be omitted.

The display apparatus 5100 according to the second exemplary embodiment includes imaging units 5110 in addition to the configuration of the display apparatus 1100 according to the first exemplary embodiment.

Each of the imaging units 5110 has an imaging function of capturing a real space moving image. The imaging units 5110 sequentially output real space images for each frame constituting the captured moving image to an apparatus control unit 5210 via a communication unit (not illustrated) (first output). The apparatus control unit 5210 transmits the real space images to an image input unit 5040 via a communication unit (not illustrated). The imaging units 5110 are provided for right and left eyes, respectively. The imaging units 5110 capture a real space moving image to be viewed from the right eye and a real space moving image to be viewed from the left eye, respectively, of the user who wears the display apparatus 5100 on the head.

An information processing apparatus 5000 will be described below.

The image input unit 5040 acquires a real space image for the right eye and a real space image for the left eye, transmitted from the apparatus control unit 5210. Then, the image input unit 5040 stores the acquired real space images in the data storage unit 1020. In the present exemplary embodiment, the image input unit 5040 performs transmission of various signals to the apparatus control unit 1510 performed by the communication unit 1040 in the first exemplary embodiment. In other words, signals are transmitted via a unit for acquiring real space images from the apparatus control unit 5210. Of course, similar to the first exemplary embodiment, signals may be transmitted by using a dedicated communication unit.

An image generation unit 5060 configures a virtual space based on the virtual space data generated by the virtual space generation unit 1050. The virtual space data includes data related to each virtual object constituting the virtual space, and data related to a light source for irradiating the virtual space. Then, the image generation unit 5060 generates a virtual space image viewed from the viewpoint. Then, the image generation unit 5060 draws the real space images stored in the data storage unit 1020. Then, the image generation unit 5060 superposes the virtual space image onto the drawn real space images to generate a combined image of the real space images and the virtual space image on a relevant memory. Then, the image generation unit 5060 divides the generated combined image into two images for the right and left eyes, and outputs the resultant images to the image distribution units 1610 and 1620, respectively (second output). At this time, the virtual space generation unit 1050 may generate real space data based on information such as depth.

Figure 6:
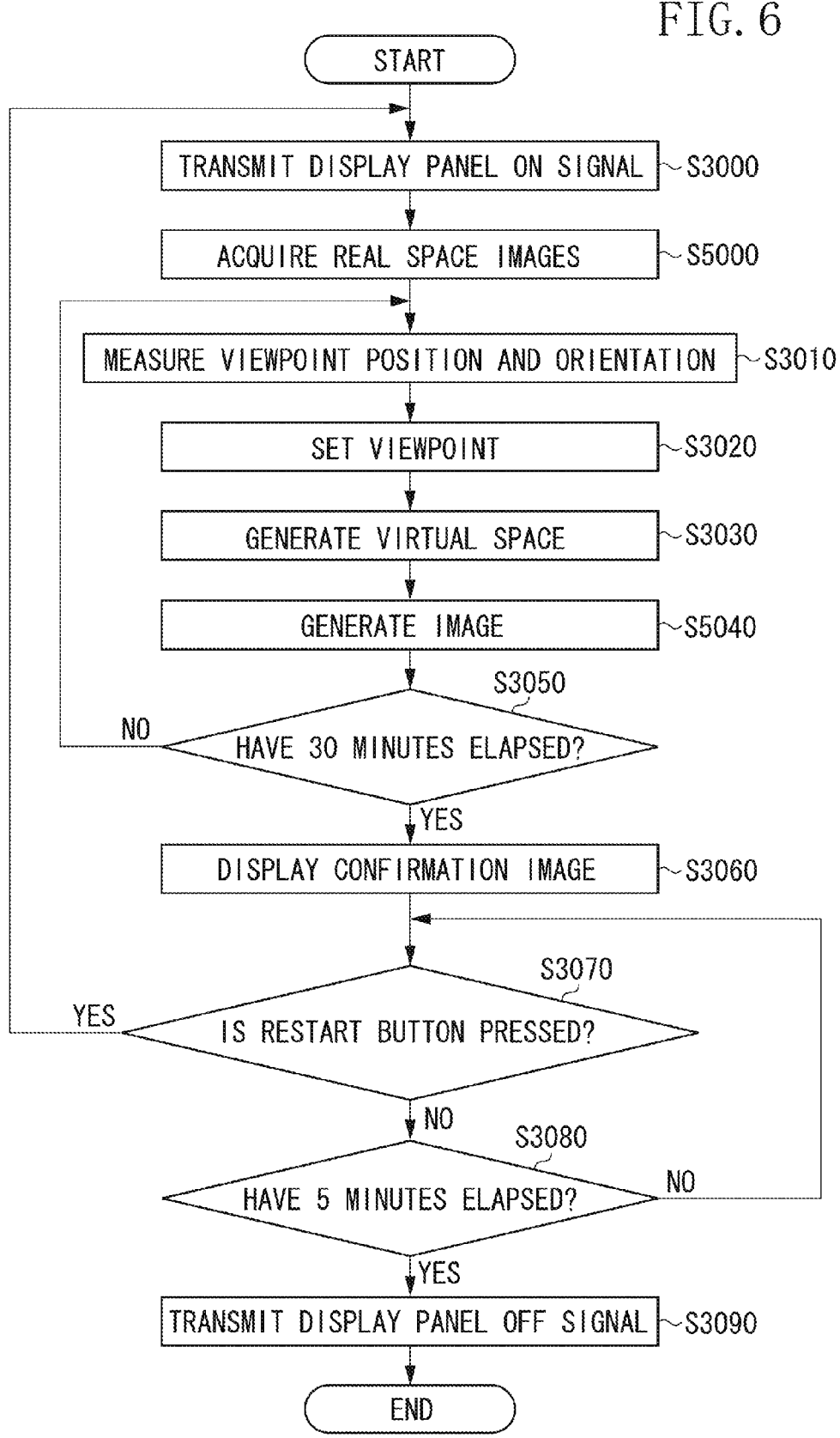
FIG. 6 is a flowchart illustrating processing performed by an information processing apparatus according to the second exemplary embodiment.

FIG. 6 is a flowchart illustrating processing performed by the information processing apparatus 5000 to transmit the display panel ON/OFF signal to the apparatus control unit 5210, generate a mixed reality image, and output generated images to the image distribution units 1610 and 1620, respectively. Steps equivalent to those in FIG. 3 are assigned the same step numbers and redundant descriptions thereof will be omitted.

In step S5000, the apparatus control unit 5210 acquires the real space images (imaging result) transmitted from the imaging units 5110, transmits the acquired images to the image input unit 5040, and stores them in the data storage unit 1020. Then, the processing proceeds to step S3010.

In step S5040, the image generation unit 5060 generates a space in which the real space images are superimposed onto the virtual space viewed from the viewpoint. Then, the processing proceeds to step S3050. Processing in step S3050 and subsequent steps is similar to that described in the first exemplary embodiment, and descriptions thereof will be omitted.

As described in the first exemplary embodiment with reference to FIG. 4, the apparatus control unit 5210 performs processing for transmitting the display panel ON/OFF signal to the display units 1110 of the display apparatus 5100 also in the second exemplary embodiment. This processing is also similar to that described in the first exemplary embodiment, and descriptions thereof will be omitted.

As described above, according to the present exemplary embodiment, it becomes possible to provide a function of reliably preventing burn-in at low cost.

Figure 2:
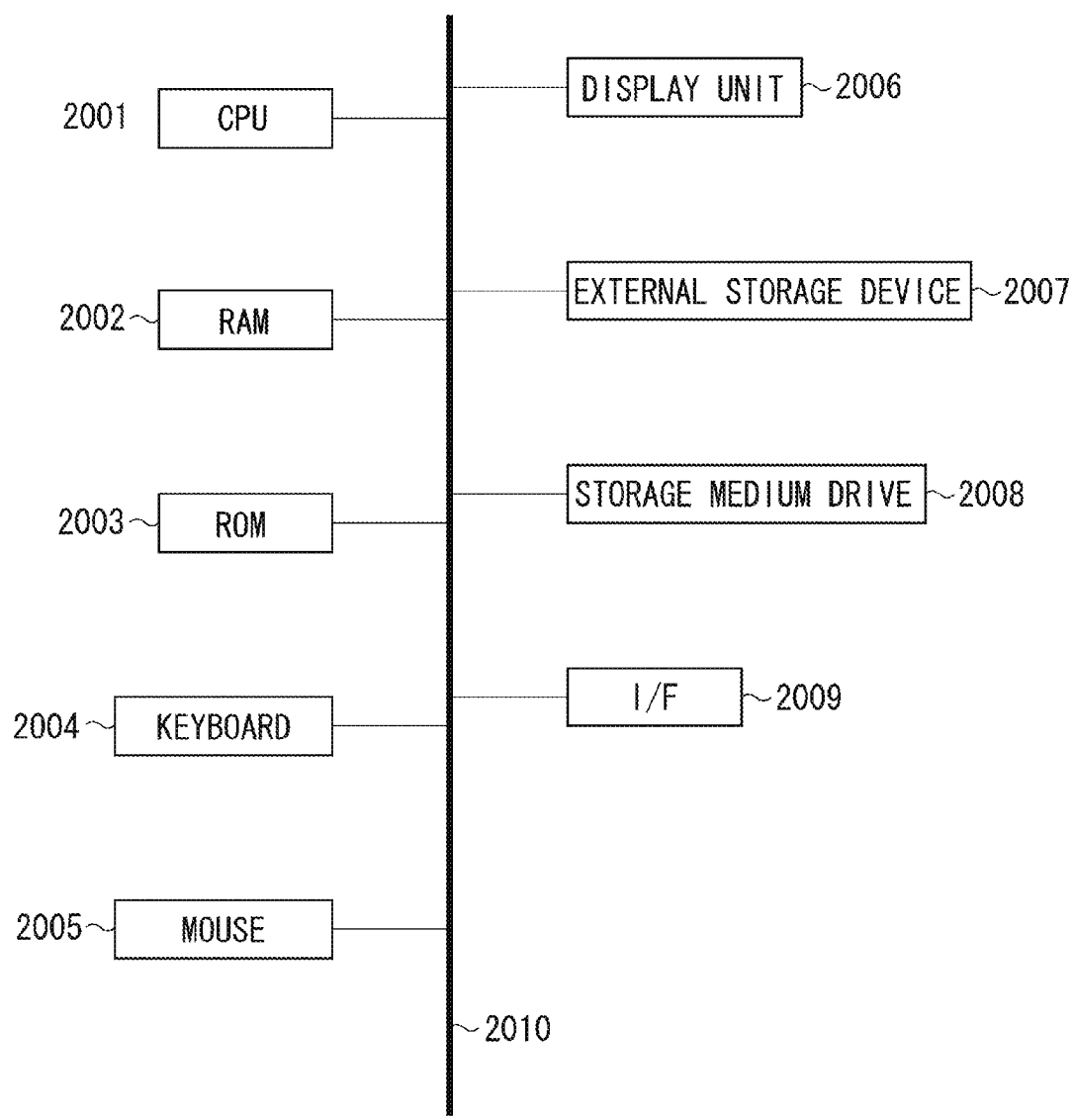
FIG. 2 is a block diagram illustrating an example of a hardware configuration of an information processing apparatus applicable to the system according to an exemplary embodiment.

FIG. 2 is a block diagram illustrating an example of a hardware configuration of the information processing apparatus according to an exemplary embodiment of the present invention.

A central processing unit (CPU) 2001 controls the entire computer by using programs and data stored in a RAM 2002 and a read-only memory (ROM) 2003, and at the same time performs each of the processes described above to be performed by the information processing apparatus 5000 in the above-described exemplary embodiments.

The RAM 2002 includes an area for temporarily storing programs and data loaded from an external storage device 2007 and a storage medium drive 2008. The RAM 2002 further includes an area for temporarily storing data received from the outside via an interface (I/F) 2009. The outside refers to, for example, the magnetic field generation apparatus 1120, and the control apparatuses 1500 and 5200. The RAM 2002 further includes a work area used by the CPU 2001 to execute each of the processes. In other words, the RAM 2002 can appropriately provide various areas. For example, the RAM 2002 also functions as the data storage unit 1020 illustrated in FIG. 1.

The ROM 2003 stores, for example, computer setting data and a boot program.

A keyboard 2004 and a mouse 2005 are examples of operation input apparatuses which are operated by a computer user to input various instructions to the CPU 2001.

A display unit 2006 includes a cathode-ray tube (CRT) or an LCD, and can display the result of processing by the CPU 2001 by using images and texts. The display unit 2006 may display the result on the external display apparatuses 1410 and 1420, and other display apparatuses. For example, the display unit 2006 can display a message to be displayed for position and orientation measurement of the display apparatuses 1100 and 5100.

The external storage device 2007 is a large-capacity information storage device represented by a hard disk drive device. The external storage device 2007 stores an operating system (OS), and programs and data for causing the CPU 2001 to execute each of the processes described above to be performed by the information processing apparatus 5000. The relevant program includes programs corresponding to the position and orientation acquisition unit 1030, and the image generation units 1060 and 5060, respectively. The relevant data includes virtual space data, and information described above as known information. The program and data stored in the external storage device 2007 are appropriately loaded into the RAM 2002 under the control of the CPU 2001. When the CPU 2001 executes processing by using a loaded program and data, each of the processes described above to be performed by the information processing apparatus 5000 is implemented. The external storage device 2007 may be used as the data storage unit 1040 illustrated in FIGS. 1 and 5.

The storage medium drive 2008 reads programs and data stored on a storage media such as a compact disc read only memory (CD-ROM) and a digital versatile disc read only memory (DVD-ROM), and writes programs and data to the relevant storage medium. A part or all of programs and data described to be stored in the external storage device 2007 may be stored on the storage medium. A program and data read from the storage medium by the storage medium drive 2008 are output to the external storage device 2007 and the RAM 2002.

The I/F 2009 includes an analog video port or a digital input/output port such as an Institute of Electrical and Electronics Engineers (IEEE)1394 compliant port for connecting the control apparatuses 1500 and 5200, or an Ethernet (registered trademark) port for outputting a combined image to the display apparatuses 1100 and 5100. Data received via the I/F 2009 is input to the RAM 2002 and the external storage device 2007. A part of the function of the image input unit 5040 illustrated in FIG. 5 is implemented by the I/F 2009. In a case where a sensor system is used to acquire the position and orientation, the sensor system is connected to the I/F 2009.

A bus 2010 connects the above-described units.

Although, in the first and the second exemplary embodiments, a stereo display type HMD having right and left display units is used as the display apparatuses 1100 and 5100, the present invention is not limited thereto. For example, the display apparatuses 1100 and 5100 may be a monocular HMD having one display unit. Instead of an HMD, the display apparatuses 1100 and 5100 may be a display apparatus having a position and orientation measurement function. Further, a position and orientation measurement apparatus may be separated from the display apparatuses 1100 and 5100. Further, the display apparatuses 1100 and 5100 may be a display apparatus having an imaging apparatus, and the imaging apparatus may be separated from the display apparatuses 1100 and 5100.

Although, in the first and the second exemplary embodiments, a magnetic sensor is used as a sensor for measuring the position and orientation, the position and orientation may be measured by extracting features of the real space through image processing. The position and orientation may be measured by using infrared light, by using a supersonic wave, or in a mechanical way.

Although, in the above-described exemplary embodiments, each unit configuring a system illustrated in FIGS. 1 and 5 is configured by hardware, a part of the units may be configured by software. In this case, a computer implementing the remaining part by hardware executes the software to operate as the system described in the above-described exemplary embodiments.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-060272 filed Mar. 22, 2013, which is hereby incorporated by reference herein in its entirety.

What is claimed is:

1. A mixed reality presenting system comprising a display apparatus, a control apparatus configured to control the display apparatus, and an information processing apparatus configured to connect the display apparatus via the control apparatus and generate a combined image to be displayed on the display apparatus, the display apparatus including:
   an imaging unit configured to capture a real space image;
   a first output unit configured to output the captured real space image to the information processing apparatus; and
   a display unit configured to acquire a combined image of the captured real space image and virtual space data from the information processing apparatus, and to display the acquired combined image,
   the information processing apparatus including:
   a first display control unit configured to control display on the display unit; and
   a second output unit configured to acquire the real space image captured by the imaging unit from the display apparatus, to combine the real space image with the virtual space data, and to output the combined image to the display apparatus,
   the control apparatus including a second display control unit configured to control display on the display unit,
   wherein, when a first time period has elapsed since the first display control unit had performed control to start display on the display unit, the first display control unit displays a confirmation image on the display unit,
   wherein, when a second time period has elapsed with no operation performed by a user since the confirmation image had been displayed, the first display control unit outputs a termination control signal to terminate display to the control apparatus, and
   wherein, the second display control unit controls to terminate display on the display unit when the termination control signal is received or a third time period has elapsed since the first display control unit had performed control to start display on the display unit.

2. The mixed reality presenting system according to claim 1, wherein the display apparatus and the control apparatus are integrally formed.

3. The mixed reality presenting system according to claim 1, wherein, when the user performs an operation on the displayed confirmation image before the second time period elapses, the timing when the second display control unit starts measuring whether the third time period has elapsed is changed from the timing when the information processing apparatus outputs the virtual space data to the display apparatus to the timing when the user performs the operation before the second time period elapses.

4. The mixed reality presenting system according to claim 1, wherein at least either one of the first display control unit and the second display control unit performs control to turn OFF display on the display unit.

5. The mixed reality presenting system according to claim 1, wherein the display apparatus is a head-mounted display apparatus or a handheld display apparatus.

6. The mixed reality presenting system according to claim 5, wherein the information processing apparatus further includes a position and orientation acquisition unit configured to acquire a position and orientation of a user's head.

7. The mixed reality presenting system according to claim 6, wherein the position and orientation acquisition unit extracts a feature from the real space image to acquire the position and the orientation.

8. A method for controlling a mixed reality presenting system including a display apparatus, a control apparatus configured to control the display apparatus, and an information processing apparatus configured to connect the display apparatus via the control apparatus and generate a combined image to be displayed on the display apparatus, the method comprising:
   capturing a real space image by an imaging unit of the display apparatus;
   outputting the captured real space image by a first output unit of the display apparatus;

acquiring a combined image of the captured real space image and virtual space data from the information processing apparatus, and displaying the acquired combined image by a display unit of the display apparatus;

controlling display on the display unit by a first display control unit of the information processing apparatus;

acquiring the captured real space image from the display apparatus, combining the real space image with the virtual space data, and outputting the combined image to the display apparatus by a second output unit of the information processing apparatus;

controlling display on the display unit by a second display control unit of the control apparatus;

displaying a confirmation image on the display unit when a first time period has elapsed since the first display control unit had performed control to start display on the display unit;

outputting a termination control signal, via the first display control unit, to terminate display to the control apparatus when a second time period has elapsed with no operation performed by a user since the confirmation image had been displayed; and controlling, via the second display control unit, to terminate display on the display unit when the termination control signal is received or a third time period has elapsed since the first display control unit had performed control to start display on the display unit.

9. A virtual reality presenting system comprising a display apparatus, a control apparatus configured to control the display apparatus, and an information processing apparatus configured to connect the display apparatus via the control apparatus and generate an image to be displayed on the display apparatus, the display apparatus including:

an acquisition unit configured to acquire an image from the information processing apparatus; and a display unit configured to display the acquired image, the information processing apparatus including:

a first display control unit configured to control display on the display unit; and an output unit configured to output to the display apparatus an image to be displayed on the display apparatus, the control apparatus including a second display control unit configured to control display on the display unit, wherein, when a first time period has elapsed since the first display control unit had performed control to start display on the display unit, the first display control unit displays a confirmation image on the display unit, wherein, when a second time period has elapsed with no operation performed by a user since the confirmation image had been displayed, the first display control unit outputs a termination control signal to terminate display to the control apparatus, and wherein, the second display control unit controls to terminate display on the display unit when the termination control signal is received or a third time period has elapsed since the first display control unit had performed control to start display on the display unit.

10. A method for controlling a virtual reality presenting system including a display apparatus, a control apparatus configured to control the display apparatus, and an information processing apparatus configured to connect the display apparatus via the control apparatus and generate an image to be displayed on the display apparatus, the method comprising:

acquiring, by the display apparatus, an image from the information processing apparatus;

displaying, by the display apparatus, the acquired image;

controlling, by the information processing apparatus, displaying by the display apparatus;

outputting, by the information processing apparatus, to the display apparatus an image to be displayed by the display apparatus; and controlling, by the control apparatus, display on the display apparatus, wherein, when a first time period has elapsed since control had been performed by the information processing apparatus to start display by the display apparatus, displaying a confirmation image by the display apparatus, wherein, when a second time period has elapsed with no operation performed by a user since the confirmation image had been displayed, the information processing apparatus outputs a termination control signal to terminate display to the control apparatus, and wherein, the control apparatus controls to terminate display on the display apparatus when the termination control signal is received or a third time period has elapsed since the information processing apparatus had performed control to start display on the display apparatus.

11. A mixed reality presenting system comprising a display apparatus, a control apparatus configured to control the display apparatus, and an information processing apparatus configured to connect the display apparatus via the control apparatus and generate a combined image to be displayed on the display apparatus, the display apparatus including:

an imaging unit configured to capture a real space image;

a first output unit configured to output the captured real space image to the information processing apparatus; and a display unit configured to acquire a combined image of the captured real space image and virtual space data from the information processing apparatus, and to display the acquired combined image, the information processing apparatus including:

a first display control unit configured to control display on the display unit; and a second output unit configured to acquire the real space image captured by the imaging unit from display apparatus, to combine the real space image with the virtual space image, and to output the combined image to the display apparatus, the control apparatus including a second display control unit configured to control display on the display unit, wherein the first display control unit displays a confirmation image on the display unit at a predetermined time interval or after a first time period, wherein, when a second time period has elapsed with no operation performed by a user since the confirmation image had been displayed, the first display control unit outputs a termination control signal to terminate display to the control apparatus, and wherein, the second display control unit controls to terminate display on the display unit when the termination control signal is received or a third time period has elapsed since the first display control unit had performed control to start display on the display unit.

12. A system comprising a display apparatus, a control apparatus configured to control the display apparatus, and an information processing apparatus configured to connect the display apparatus via the control apparatus and generate a virtual image to be displayed on the display apparatus, the display apparatus including:

a display unit configured to acquire a virtual image and to display the virtual image;

the information processing apparatus including:

a first display control unit configured to control display on the display unit; and a second output unit configured to generate a virtual image and to output the virtual image to the display apparatus, the control apparatus including a second display control unit configured to control display on the display unit, wherein, when a first time period has elapsed since the first display control unit had performed control to start display on the display unit, the first display control unit displays a confirmation image on the display unit, wherein, when a second time period has elapsed with no operation performed by a user since the confirmation image had been displayed, the first display control unit outputs a termination control signal to terminate display to the control apparatus, and wherein, the second display control unit controls to terminate display on the display unit when the termination control signal is received or a third time period has elapsed since the first display control unit had performed control to start display on the display unit.

* * * * *